United States Patent

Krall

[11] 4,123,218
[45] Oct. 31, 1978

[54] BLOW PIN ASSEMBLY WITH VENTING MEANS

[75] Inventor: Thomas J. Krall, Toledo, Ohio

[73] Assignee: Owens-Illinois, Inc., Toledo, Ohio

[21] Appl. No.: 813,854

[22] Filed: Jul. 8, 1977

[51] Int. Cl.$^2$ .............................................. B29D 23/03
[52] U.S. Cl. .................................... 425/535; 425/812
[58] Field of Search ......................... 425/812, 524, 535

[56] References Cited

U.S. PATENT DOCUMENTS

| 3,084,382 | 4/1963 | Stuchbery | 425/535 X |
| 3,354,509 | 11/1967 | Ammondson | 425/812 X |
| 3,358,061 | 12/1967 | Gidge et al. | 425/812 X |
| 3,937,610 | 2/1976 | Farrell | 425/535 X |

*Primary Examiner*—Richard B. Lazarus
*Attorney, Agent, or Firm*—Charles S. Lynch; Richard D. Heberling

[57] ABSTRACT

A blow pin assembly for blowmolding plastic containers is disclosed. The assembly includes threads and an annular shoulder for molding a threaded bunghole with a flat sealing surface. The annular shoulder is provided by the bottom end of a cylindrical sleeve which fits over the main body of the blow pin. A narrow gap is defined between the main body and the sleeve, which provides a vent for air that otherwise gets captured between the parison and the main body.

5 Claims, 3 Drawing Figures

BLOW PIN ASSEMBLY WITH VENTING MEANS

BACKGROUND OF THE INVENTION

The present invention relates to the art of blow-molding freestanding plastic drums, and more specifically to the drum bungholes. Conventionally, plastic drums are manufactured by extruding a cylindrical parison into a chamber defined by open mold sections, inserting at least one blow pin into one end of the parison, closing the mold sections which compresses a portion of the parison against the blow pin forming the bunghole, blowing air through the blow pin and into the parison so as to expand the remainder of the parison to the interior surface of the closed mold, opening the mold, and then removing the blow pin from the final blown article.

In such a method, the blow pin generally has an annular shoulder which forms a sealing surface on the molded bunghole for abutting a reciprocal surface on the bung, or closure. Additionally, the blow pin assembly generally would include means for providing the bunghole with threads for cooperative engagement with a closure. Such means might consist of threads on the blow pin itself for casting the image onto the molding plastic, or it might consist of a threaded plastic or metal insert temporarily affixed to the blow pin but over which the plastic may be molded and which remains as a part of the bunghole upon removal of the blow pin.

One of the problems associated with the sealing surfaces of bungholes made by the above method is that the surfaces generally slope upwardly and outwardly from the center axis of the bunghole, thereby requiring the use of a highly elastic and compressible gasket to effect a seal.

One of the shortcomings of the compression molded plastic threads has been their poor definition leading to cross-threading and reduction of their mechanical advantage. Finally, as will be pointed out below, a related inefficiency of the above-described method of manufacturing plastic drums, with respect to compression molding over a threaded plastic insert, is the difficulty of bonding the adjacent surfaces of the molding plastic and the insert without considerable preheating of the insert.

SUMMARY OF THE INVENTION

The present invention is directed to and resolves each of the plaguing difficulties discussed above. At its foundation lies the discovery and acceptance of the theory that the sloping sealing surface and poorly defined threads are the results of air trapped between and compressed by the molding plastic and the blow pin, thereby preventing complete contiguous casting of the desired blow pin exterior features. Similarly, air trapped between the plastic molding and, for example, a plastic insert hinders complete contact between the adjacent surfaces and acts as a heat insulator to retard bonding.

The invention disclosed herein provides a blow pin assembly which vents the air captured between the molding plastic and the blow pin. When a threaded insert is molded into an article, the blow pin assembly vents air from between the molding material and the insert and the blow pin. One preferred embodiment includes a slot about the annular shoulder on the blow pin which exhausts to the atmosphere outside the mold.

It is, therefore, an object of the present invention to increase the flatness of bunghole sealing surfaces in molded plastic articles.

It is also an object to improve the thread definition of compression molded plastic bungholes.

It is still further an object to improve the bond between molding plastic and plastic inserts for drum bungholes.

Other objects and advantages of the invention will be apparent to those skilled in the art from the following detailed description of the invention, with reference made to the drawings.

BRIEF DESCRIPTION TO THE DRAWINGS

DETAILED DESCRIPTION OF A PREFERRED EMBODIMENT

Figure 1:
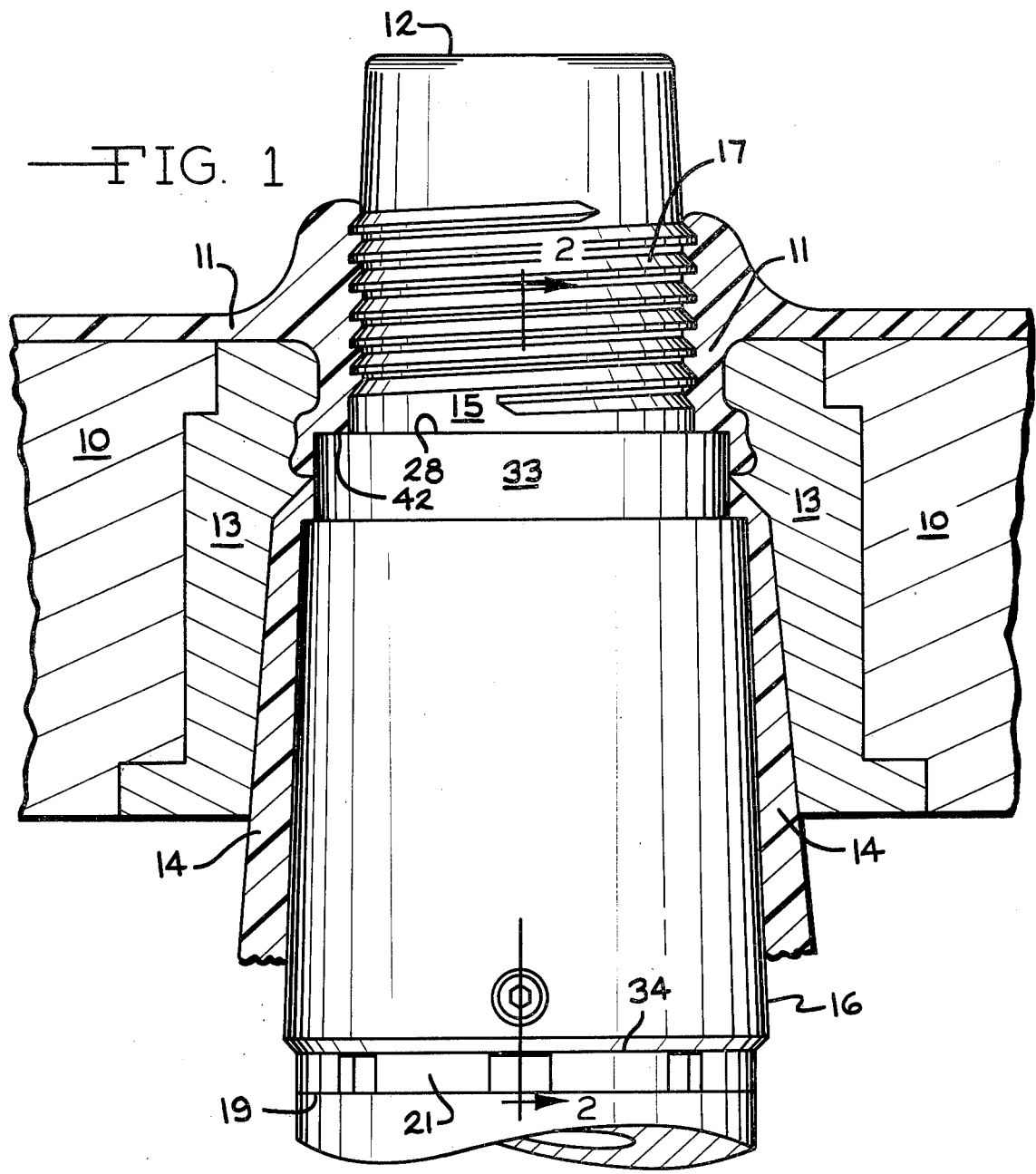
FIG. 1 is a cross-sectional view of a preferred embodiment of a blow pin assembly in accordance with the present invention surrounded by a molded parison end and fragmentary portions of closed mold sections.
Figure 2:
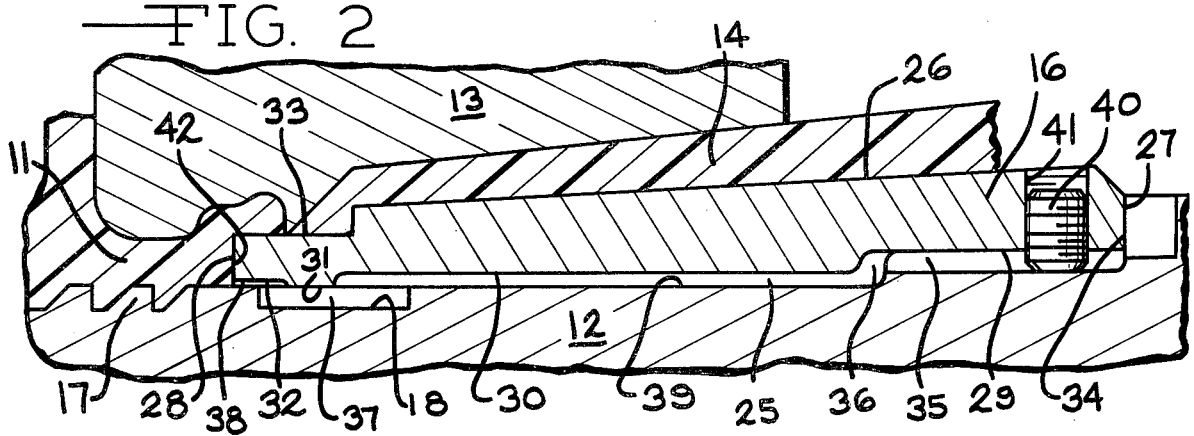
FIG. 2 is a fragmentary sectional view along line 2—2 in FIG. 1.
Figure 3:
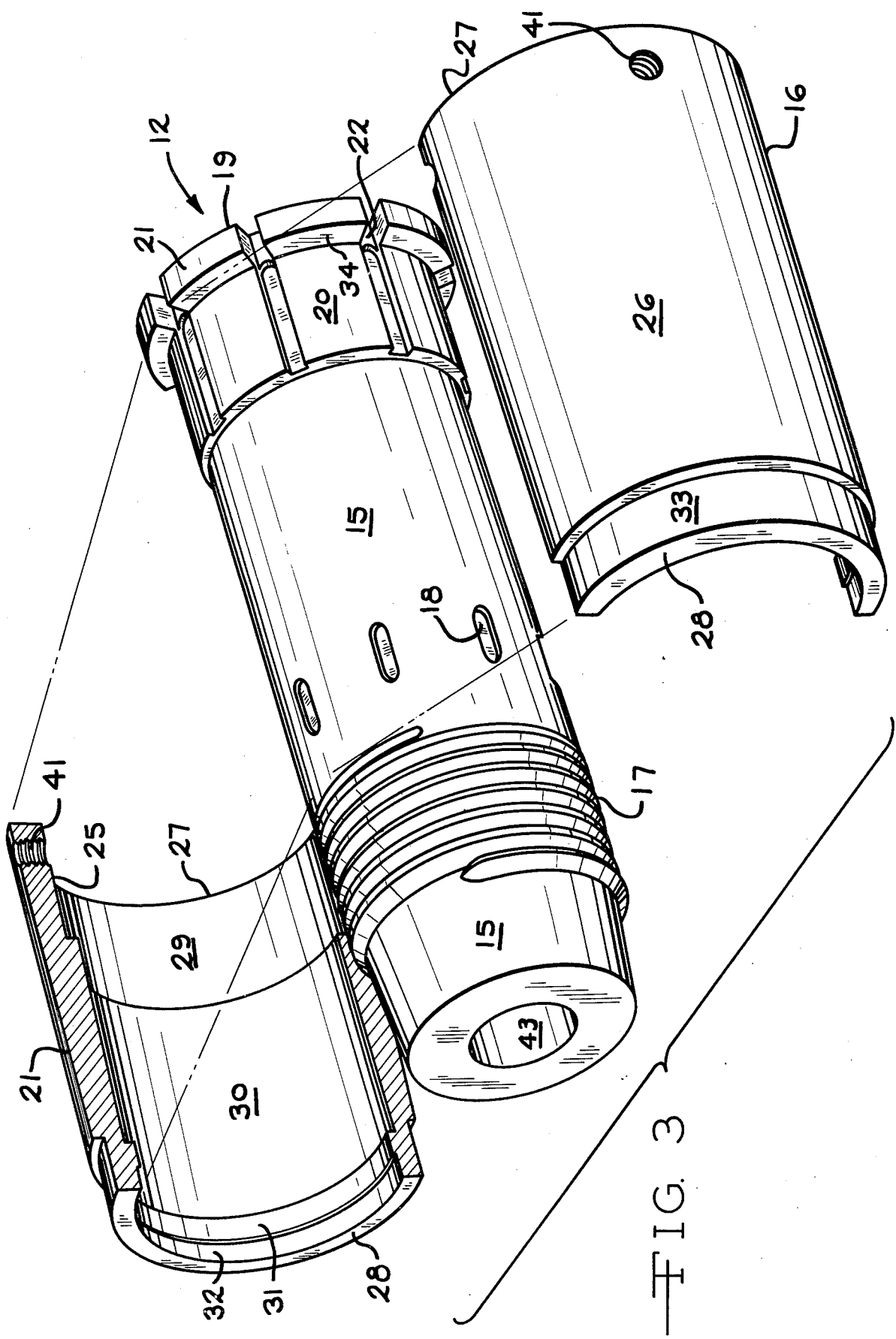
FIG. 3 is a perspective view of the blow pin assembly with the sleeve shown cut in half longitudinally and expanded from the main blow pin body.

As discussed above, the bunghole in a plastic drum is generally formed by closing a pair of mold sections which compresses an end portion of a parison against a blow pin assembly. This is shown in FIG. 1, where the mold sections, the parison, and the blow pin assembly are represented by the numerals 10, 11 and 12, respectively. The mold sections 10 usually include a separate bunghole-forming die 13 to compress the parison 11 and cut off the excess material, i.e., the flash 14.

The separate bunghole-forming die 13 is removable and substitutable, allowing for diversity in design or replacement of worn parts without changing the entire mold sections 10. Also, the die 13 may be made from a heat-conducting material, such as copper, to absorb heat from the bunghole region of the parison 11, thereby decreasing the opportunities for subsequent slumping of the plastic upon opening of the mold sections 10. Oftentimes, the die 13 will additionally incorporate means for cooling the bunghole, such as water channels.

The blow pin assembly 12 includes a cylindrical main body 15 and a sleeve 16 which cooperatively engage each other to form a vent, as is explained in detail below. The external surface of the main body 15, which is of concern here, includes external threads 17, a horizontal row of cavities 18 evenly spaced around its periphery, and, at an upper end 19, a collar 20 abutting a circumferential flange 21. About its circumfernce, the collar 20 includes evenly spaced elongate slots 22, coextensive with the length of the collar 20 and continuing through the flange 21.

The blow pin sleeve 16 has inner, outer, top and bottom surfaces 25, 26, 27 and 28, respectively. The inner surface 25 comprises four annular sections, conveniently denoted in the illustrations as sections 29–32. The outer surface 26 includes an annular recess 33 adjacent its bottom surface 28.

The sleeve 16 is positioned on the main body 15 such that its top surface 27 abuts a shoulder 34 formed by the flange 21 on the collar 20. The outermost annular section 29 forms a recess 35 with the adjacent annular section 30 for receiving the collar 20. The length of the recess 35 is slightly greater than the length of the collar 20 such that a clearance 36 is defined therebetween. The innermost annular section 31 is a band which contacts the blow pin main body 15 circumferentially adjacent the circumferential row of evenly spaced cavities 18, such that gaps 37 exist between the annular section 31 and the cavities 18. The annular section 32 between the annular section 31 and the bottom surface 28 then establishes a narrow aperture 38 with the main body 15. Also, the annular section 30 between the section 31 and the outermost section 29 creates a chamber 39 with the main body 15. Therefore, a continuous fluid passageway exists from the bottom surface 28 of the sleeve 16 through the narrow aperture 38, the gaps 37, the chamber 39, the clearance 36, and the evenly spaced elongate slots 22 to the upper end 19 of the blow pin assembly 12. The sleeve 16 is secured to the blow pin main body 15 by means of set screws 40 in threaded engagement with holes 41 bored through the sleeve 16.

As shown in the drawings, the parison 11 is compressed against the threads 17 of the blow pin main body 15, and the bottom surface 28 and adjacent recess 33 of the blow pin sleeve 16. The bottom surface 28 of the sleeve 16 molds a flat annular sealing surface 42 in the adjacent plastic. Subsequent to the closing of the mold sections 10, air is injected into the parison 11 through an axial air passage 43 extending through the main body 15, whereby the parison 11 is blown into a plastic drum.

With conventional prior art blow pin assemblies, the bottom surface 28 joined the main body 15 of the blow pin 12 such that there was no intermediate gap. As a result, when the parison was compressed against the blow pin assembly, air was trapped therebetween, eventuating in poorly defined threads and a sloping sealing surface in the bunghole. Particularly troublesome was air caught at the corner junction of the blow pin main body and the bottom surface which molds the sealing surface.

With the blow pin assembly of the present invention, as described below, venting for the trapped air is provided by the narrow aperture 38 between the annular section 32 and the main body 15. This venting arrangement produces a flat sealing surface and, surprisingly, results in much improved definition of the threads. Consequently, the need for gaskets and the problem of cross-threading is minimized or eliminated.

It should be apparent that the venting arrangement described above is for illustrative purposes only, and that there are, and will be, many variations to accomplish the same purpose. For example, the venting need not open to the atmosphere, but can simply comprise a closed cavity in which the trapped air is temporarily compressed until opening of the mold sections. It should be clear, however, that in order to achieve a flat sealing surface, the vent opening at the sealing surface must be narrow enough to prevent the intrusion of plastic therein.

Also, while the pin assembly is described above in great detail with such sidewall features as the threads 17 and the bottom surface 28 of the sleeve 16, other sidewall features or surface means may also be incorporated. For example, the pin assembly might include a threaded plastic insert about the circumference of the pin body. In such a case, the venting means would not only aid in molding the plastic around the insert, but would provide greater adhesion between the insert and the parison by eliminating the trapped air which otherwise acts as an insulator. After blowmolding, the remainder of the pin assembly may be separated from the insert and removed from the container; the insert then becomes a part of the bunghole.

Various other advantages of the present invention will be apparent to those skilled in the art and various modifications may be made without departing from the scope and spirit of the attached claims.

What I claim is:

1. A blow pin assembly for forming a bunghole in a plastic parison and for supplying blow air to expand such parison into a hollow container, comprising a generally cylindrical pin body having an axial blow air passage means extending therethrough and having a projecting end means for inserting into an end of such parison, thread means formed in said projecting end means for molding bunghole threads in such parison end, a tubular sleeve mounted coaxially on said pin body, said sleeve having an annular end means adjacent said thread means and facing said projecting end means for molding a flat annular sealing surface in such parison end adjacent such bunghole threads, and means between said sleeve and said pin body for venting trapped air from between such parison, said thread means and said annular end means during molding.

2. A blow pin assembly, as set forth in claim 1, wherein said venting means includes a narrow annular opening between said annular end means and said pin body.

3. A blow pin assembly for forming a bunghole in a plastic parison and for supplying blow air to expand such parison into a hollow container, comprising a generally cylindrical pin body having an axial blow air passage means extending therethrough and having a projecting end means for inserting into an end of such parison for molding a bunghole in such parison end, a tubular sleeve mounted coaxially on said pin body, said sleeve having an annular end means adjacent said projecting end means and facing said projecting end means for molding a flat annular sealing surface in such parison end adjacent such projecting end means, and means between said sleeve and said pin body for venting trapped air from between such parison, said projecting end means and said annular end means during molding.

4. A blow pin assembly, as set forth in claim 3, wherein said venting means includes a narrow annular opening between said annular end means and said pin body.

5. A pin assembly for forming bungholes in plastic parisons having means for inserting an elongated pin body into an open end of the parison and compressing the parison against the pin body, said pin assembly comprising an elongated pin body having a projecting end means for inserting into such open end of such parison and having an axial blow air passage means, a sidewall surface on said elongated pin body, an annular shoulder means for compression molding a portion of said bunghole facing toward said projecting end means and being generally perpendicular to said elongated body surface, said projecting end means being for compression molding a portion of such parison into a bunghole and against which air is trapped by such parison during molding, and an aperture between said projecting end means and said shoulder for venting said trapped air.

* * * * *